US010229182B2

(12) United States Patent
Bhatt et al.

(10) Patent No.: US 10,229,182 B2
(45) Date of Patent: *Mar. 12, 2019

(54) FRIEND LOCATOR BASED ON FRIEND NETWORK AND PROFILE

(71) Applicant: INTERNATIONAL BUSINESS MACHINES CORPORATION, Armonk, NY (US)

(72) Inventors: Dhruv A. Bhatt, Indian Trail, NC (US); Kristin E. McNeil, Charlotte, NC (US); Nitaben A. Patel, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/016,959

(22) Filed: Jun. 25, 2018

(65) Prior Publication Data
US 2018/0307738 A1 Oct. 25, 2018

Related U.S. Application Data

(63) Continuation of application No. 14/659,646, filed on Mar. 17, 2015, now Pat. No. 10,031,964.

(51) Int. Cl.
G06F 17/30 (2006.01)
G06F 17/27 (2006.01)
(Continued)

(52) U.S. Cl.
CPC ...... *G06F 17/30595* (2013.01); *G06F 17/278* (2013.01); *G06F 17/3053* (2013.01);
(Continued)

(58) Field of Classification Search
CPC ............. G06F 17/3064; G06F 17/3097; G06F 17/30973; G06F 17/30985; G06F 17/30991
See application file for complete search history.

(56) References Cited

U.S. PATENT DOCUMENTS 8,019,692 B2 9/2011 Rosen
8,341,081 B1 * 12/2012 Wang ..................... G06Q 40/02
705/39

(Continued)

OTHER PUBLICATIONS

Anonymous, "Generating 'Interesting' Social Incentives to Attract Traffic to Online Polls," An IP.com Prior Art Database Technical Disclosure, Oct. 3, 2010, p. 1-4, IP.com No. 000200263.
(Continued)

*Primary Examiner* — Dinku W Gebresenbet
(74) *Attorney, Agent, or Firm* — Patricia B. Feighan

(57) ABSTRACT

A method for identifying at least one contact associated with a user and an online communication network. The method may include receiving at least one search term or a social media post entered by the user. The method may also include performing text analytics on the received search term or the social media post to determine at least one subject. The method may further include identifying a plurality of contacts associated with the user, whereby the user and the plurality of contacts are associated with the online communication network. The method may additionally include performing text analytics on a plurality of communications associated with the identified plurality of contacts to determine a plurality of context information. The method may include comparing the determined subject to the determined plurality of context information. The method may include identifying at least one contact within the identified plurality of contacts based on the comparing.

17 Claims, 5 Drawing Sheets

(51) Int. Cl.
*H04L 29/08* (2006.01)
*H04L 12/58* (2006.01)

(52) U.S. Cl.
CPC .. *G06F 17/30401* (2013.01); *G06F 17/30528* (2013.01); *G06F 17/30867* (2013.01); *H04L 51/32* (2013.01); *H04L 67/1044* (2013.01); *H04L 67/22* (2013.01); *H04L 67/306* (2013.01)

(56) References Cited

U.S. PATENT DOCUMENTS

| | | | |
|---|---|---|---|
| 8,489,515 | B2 | 7/2013 | Mathur |
| 10,031,964 | B2 | 7/2018 | Bhatt et al. |
| 2009/0204601 | A1 | 8/2009 | Grasset |
| 2012/0078726 | A1 | 3/2012 | Black et al. |
| 2012/0331064 | A1 | 12/2012 | Deeter et al. |
| 2013/0036112 | A1* | 2/2013 | Poon ................. G06F 17/30864 707/723 |
| 2013/0073971 | A1 | 3/2013 | Huang et al. |
| 2014/0012927 | A1* | 1/2014 | Gertzfield ............. G06Q 50/01 709/206 |
| 2014/0258276 | A1* | 9/2014 | Fredinburg ....... G06F 17/30867 707/723 |
| 2014/0344304 | A1* | 11/2014 | Topatan ............. G06F 17/3064 707/767 |
| 2016/0275166 | A1 | 9/2016 | Bhatt et al. |

OTHER PUBLICATIONS

Anonymous, "Methods, Systems, and Media for Messaging Targeted Users," An IP.com Prior Art Database Technical Disclosure, May 16, 2014, 18 Pages, IP.com No. 000236820.

Anonymous, "System and Method to Share Information in Social Network Based on Mining Chat Message and Browsing History," An IP.com Prior Art Database Technical Disclosure, Nov. 22, 2011, p. 1-7, IP.com No. 000212660.

Mell et al., "The NIST Definition of Cloud Computing," National Institute of Standards and Technology, Information Technology Laboratory, Oct. 7, 2009, Version 15.

IBM, "List of IBM Patents or Patent Applications Treated as Related (Appendix P)," Sep. 28, 2018, p. 1-2.

\* cited by examiner

FRIEND LOCATOR BASED ON FRIEND NETWORK AND PROFILE

BACKGROUND

The present invention relates generally to the field of computers, and more particularly to online communication networks.

A social networking service is an online service, platform, or site that focuses on facilitating the building of social networks or social relations among people who, for example, may share interests, activities, backgrounds, etc. Many people utilize such social networks to build a friend network. The friends in a friend network may have their own friends that they are connected with on social media sites. As a result, a user's friend network has the potential to be vast, with each person submitting a great deal of personal information to the social media site.

SUMMARY

According to one embodiment, a method for identifying at least one contact associated with a user and an online communication network is provided. The method may include receiving at least one search term or a social media post entered by the user. The method may also include performing text analytics on the received search term or the social media post to determine at least one subject. The method may further include identifying a plurality of contacts associated with the user, whereby the user and the plurality of contacts are associated with the online communication network. The method may additionally include performing text analytics on a plurality of communications associated with the identified plurality of contacts to determine a plurality of context information. The method may include comparing the determined subject to the determined plurality of context information. The method may also include identifying at least one contact within the identified plurality of contacts based on the comparing.

According to another embodiment, a computer system for identifying at least one contact associated with a user and an online communication network is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving at least one search term or a social media post entered by the user. The method may also include performing text analytics on the received search term or the social media post to determine at least one subject. The method may further include identifying a plurality of contacts associated with the user, whereby the user and the plurality of contacts are associated with the online communication network. The method may additionally include performing text analytics on a plurality of communications associated with the identified plurality of contacts to determine a plurality of context information. The method may include comparing the determined subject to the determined plurality of context information. The method may also include identifying at least one contact within the identified plurality of contacts based on the comparing.

According to yet another embodiment, a computer program product for identifying at least one contact associated with a user and an online communication network is provided. The computer program product may include one or more computer-readable storage devices and program instructions stored on at least one of the one or me tangible storage devices, the program instructions executable by a processor. The computer program product may include program instructions to receive at least one search term or a social media post entered by the user. The computer program product may also include program instructions to perform text analytics on the received search term or the social media post to determine at least one subject. The computer program product may further include program instructions to identify a plurality of contacts associated with the user, whereby the user and the plurality of contacts are associated with the online communication network. The computer program product may additionally include program instructions to perform text analytics on a plurality of communications associated with the identified plurality of contacts to determine a plurality of context information. The computer program product may include program instructions to compare the determined subject to the determined plurality of context information. The computer program product may also include program instructions to identify at least one contact within the identified plurality of contacts based on the comparing.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
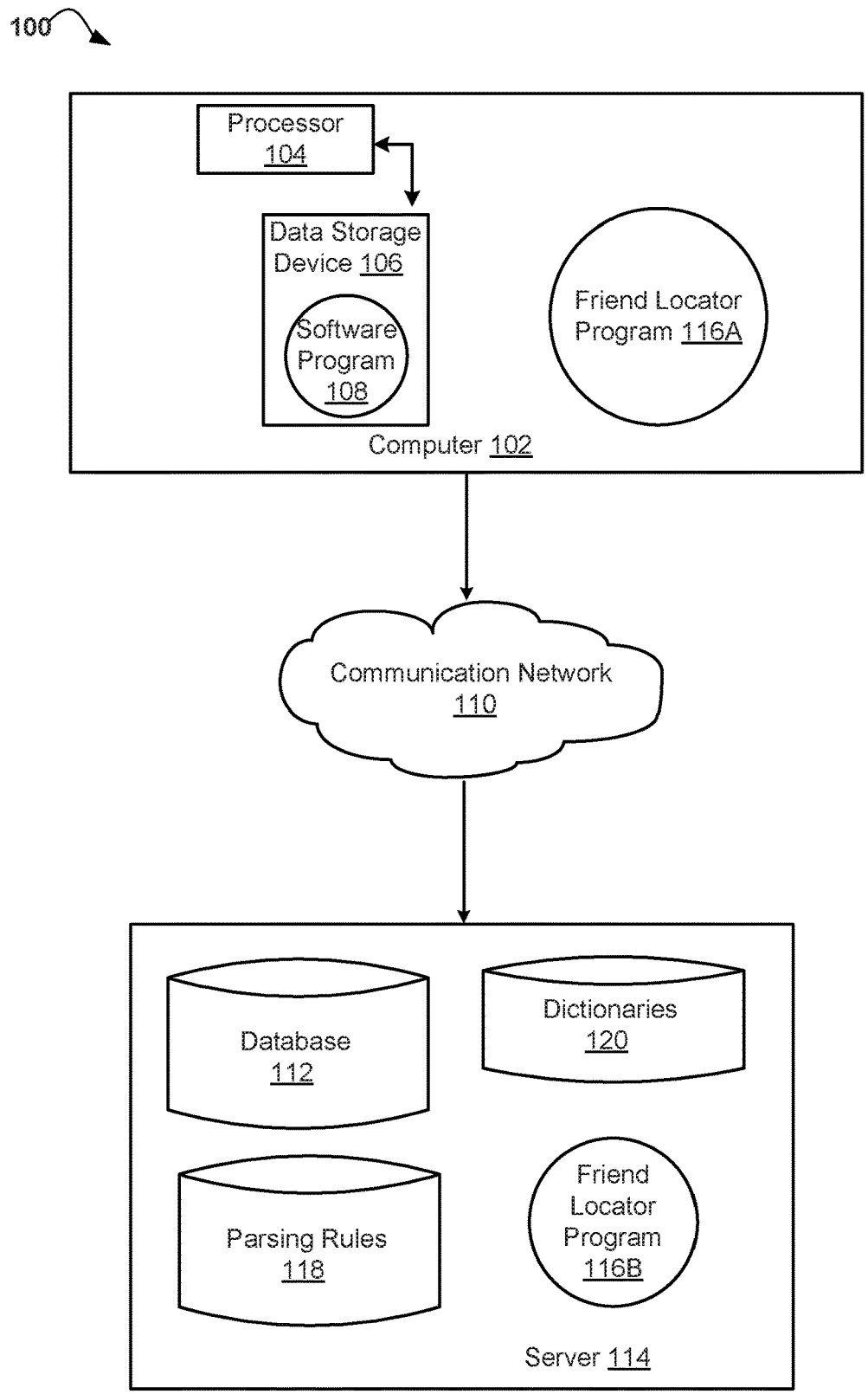
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to online communication networks. The following described exemplary embodiments provide a system, method and program product to, among other things, provide a friend locator based on a friend network and profile. Therefore, the present embodiment has the capacity to improve the technical field of online communication networks by providing a way to find a friend associated with an online communication network, such as a social network, based on a subject matter. More specifically, the present embodiment may perform text analytics on social media posts to identify other social media users who may have useful knowledge for the user based on a subject matter.

As previously described, many people utilize such social networks to build a friend network. The friends in a friend network may have their own friends that they are connected with on social media sites. As a result, a user's friend network has the potential to be vast, with each person submitting a great deal of personal information to the social media site. Therefore, as a user of social media, it may be difficult to sort through the vast amount of information. Social media may allow a user to search for friends based on email addresses and as such, may provide other friends that the user may know. However, current online communication services do not provide the ability to find a friend based on a subject matter.

Furthermore, a process that utilizes social networking to find friends based on a subject matter, such as by city, by travel route, by education, etc. may be useful. Also, it may be useful when some friends are found by the process, for the friend network to display how the user knows the person (i.e., the user's friend's friend).

For example, there may be times when a user may be traveling to another city and may want to obtain advice from someone in the user's social network that knows about the city or perhaps to see if the user can stay at their house. Additionally, another example may be, that a user may want to learn about an event and a friend in the user's network was going to this event or has gone to this event in the past. Therefore, it may be useful for the user to be able to search via their friend network and profile associated with the user's on-line social network service. However, the current technology does not allow for this knowledge to occur as often as possible.

As such, it may be advantageous, among other things, to provide a friend locator based on a subject matter, whereby the friend locator utilizes a user's friend network and profile.

According to at least one implementation, the present embodiment may perform text analytics on social media posts to identify other social media users who have useful knowledge for the user. Prior to the user entering the post or search text, text analytics may be performed on the users' friend network and anyone with open access on the social media site to analyze the text to determine annotations (i.e., identified text). The annotations found in the text currently being written by the user in the current post may then be compared against the annotations found in other user's social media posts, user profile, and GPS information. Then, an algorithm may be used to compute a score as to how likely the other social media user knows the topic of the current user's post.

Furthermore, the present embodiment may analyze text that a user types and determine it is related to a particular topic, such as a future trip to Florida. For example, the user may type: "I am going to Florida on Saturday". As such, the present embodiment may determine that the subject is Florida (i.e., the state), the time is Saturday, and the timing is future. Then, the present embodiment may search the annotation values for the other social media members the user has accessed and display possible friends that live in that area or that have been to that area (based on GPS or text analysis gathering, for example).

Various implementations of the present embodiment may find the common ground between the context of a user's comments and the comments and contents of the user's friends or contacts to compile a list of friends that have anything in common with one another. As such, the present embodiment may identify the context and compile a list of friends that share similarities in some way to the comment. For example, if the user is entering a status message as "Watching California-Stanford football! Go bears", the present embodiment may compile a list of user's friends (or friends' friends) who are also watching the same game, who attends or attended the same college, who lives in California, and so forth. Therefore, the present embodiment may compile a list of friends (or friend's friends) that are in any way related to a user's comment/post.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide a friend locator based on a friend network and profile. According to at least one implementation, text analytics may be performed on a user's social media post to propose friends in their social network that might have information regarding their post. As such, the present embodiment, may perform text analytics on all of a user's friends and friends of friends' posts and profile information to determine annotations on the text. Then, the annotation information may be stored in a repository, such as a database. Therefore, when a user writes a social media post, the text may be analyzed using dictionaries and a rules engine. For example, one implementation may include technology framework, such as, but not limited to Unstructured Information Management Architecture (UIMA). The dictionaries and rules may be created ahead of time and therefore, may assist with interpreting the text. The subject or topic of the user's post may be determined with text analytics. As such, the subject may be matched against similar subjects written by the user friends in the past. Then, a score may be generated to evaluate which friend has written about the subject the closest.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Friend Locator program 116A. The networked computer environment 100 may also include a server 114 that is enabled to run a Friend Locator program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Friend Locator program 116B running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800*b* and external components 900*b*, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Friend Locator program 116A, 116B may interact with a database 112 that may be embedded in various storage devices, such as, but not limited to a computer/mobile device 102, a networked server 114, or a cloud storage service.

As previously described, the client computer 102 may access the Friend Locator program 116B, running on server computer 114 via the communications network 110. For example, a user using a client computer 102 may use the Friend Locator program 116A, 116B to perform text analytics on a user's social media post to propose friends in their social network that might have information regarding their post. As such, the present embodiment, may perform text analytics on all of a user's friends and friends of friends' posts and profile information to determine annotations on the text. Then, the annotation information may be stored in a repository, such as a database 112. As such, when a user writes a social media post, the text may be analyzed using dictionaries 120 and a rules engine (i.e., parsing rules 118). The Friend Locator method is explained in more detail below with respect to FIG. 2.

Figure 2:
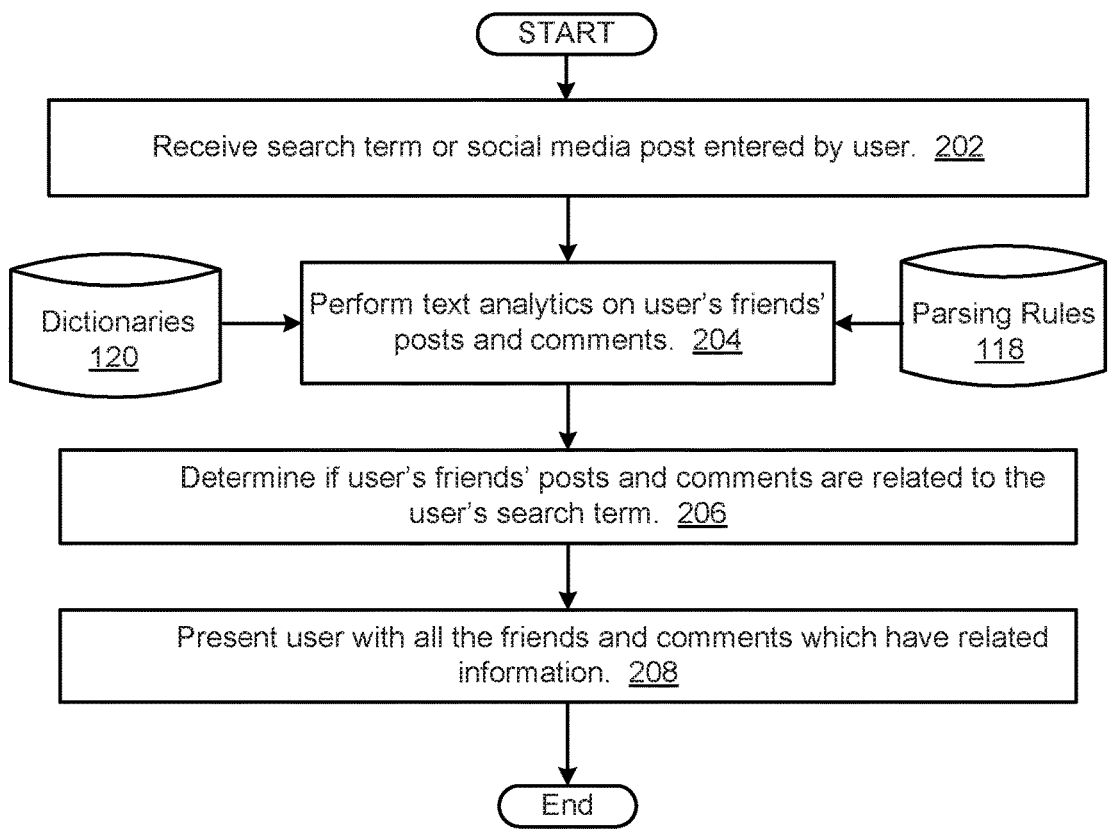
FIG. 2 is an operational flowchart illustrating the steps carried out by a friend locator program according to at least one embodiment.

Referring now to FIG. 2, an operational flowchart 200 illustrating the steps carried out by a friend locator program. As previously described, the Friend Locator program 116A, 116B (FIG. 1) may perform text analytics on a user's social media post to propose friends in their social network that might have information regarding their post.

Therefore with respect to FIG. 2 at 202, the Friend Locator program 116A, 116B (FIG. 1) receives a search term or social media post that was entered by a user. As such, a user may type in search text or a social media post. For example, a user may enter a search term, such as Boston, Mass. Additionally, a user may enter a social media post, such as "I am going to Chicago". As such, the text analytics may identify the city "Chicago" and find other people in the user's network who are located in Chicago or posted about Chicago before. Therefore, according to at least one implementation, the Friend Locator program 116A, 116B (FIG. 1) will perform text analytics on the text entered by the user to determine the annotations being sought after. Therefore, the subject or topic of the user's post may be determined with text analytics, such as NLP. According to at least one implementation, when a user writes a social media post, the text may be analyzed using dictionaries 120 and a rules engine 118. For example, one implementation may include technology framework, such as, but not limited to Unstructured Information Management Architecture (UIMA). The dictionaries and rules may be created ahead of time and therefore, may assist with interpreting the text.

Next at 204, the Friend Locator program 116A, 116B (FIG. 1) will perform text analytics (e.g., NLP) on the user's friends' posts and comments. As such, the present embodiment will identify the user's friends. According to at least one implementation, the friends may be identified after meeting a criteria, such as a strength relationship to the user. For example, the method may search the user's on-line communication contacts associated with an online communication network to locate friends of the user and friends of friends of the user. The online communication network may be selected from a group consisting of, but not limited to email, instant message (IM), short message service (SMS), social networking, and WIKI.

Then, according to at least one implementation, parsing rules 118 and dictionaries 120 are used to perform text analysis on the past posts and comments of the user's friend network and all public sites. As such, dictionaries 120 and parsing rules 118 are used to parse the information to determine the annotations of the friends' posts. Then, the annotation information may be stored in a repository, such as a database 112 (FIG. 1).

Then at 206, the Friend Locator program 116A, 116B (FIG. 1) will determine if the user's friends' posts and comments are related to the user's search term. Therefore, a process is used to determine if the friend's posts and comments are related to the user's entered text in step 202, previously described above. According to at least one implementation, an algorithm may be used to generate a score for the friend's text based on how closely the annotations match the user's information, such as, but not limited to the other friend's text, the friend's profile information, and the friend's GPS information. As such, the subject may be matched against similar subjects written by the user's friends in the past. Then, a score (i.e., a similarity ranking) may be generated to evaluate which friend has written most closely about the subject. The similarity ranking may be performed by applying a subject based on criteria selected from a group consisting of, but not limited to location, sentiment, age, membership, event, product, application, and etc.

Next at 208, the Friend Locator program 116A, 116B (FIG. 1) will present the user with all the friends and comments which have related information to the user's text. As such, a list of friends along with text from the post and a score may be generated. For example:

User 1 and User 2 are friends

On Jan. 1, 2012 User 1 posts: I just finished a semester aboard in Japan. I learned so much and enjoyed all of it.

On Dec. 1, 2012 User 2 posts: I am going to travel to Tokyo for work. I can't wait for the trip.

Annotators:

Country Dictionary containing all of the country names

Trip Reason rule: Identifies the text as a trip and then determines the reason for the trip.

City dictionary containing all the cities

Country City Dictionary; Dictionary per country that list all of the countries cities Country rule; determine the country if the country dictionary annotation or a city annotation is found. If a city annotation, then determine the country based on the Country City dictionary.

The annotators find the following annotations based on the above user's posts:

User 1 post: Country: Japan

Trip Reason: education

User 2 post: Country: Japan

Trip Reason: work

City: Tokyo

According to the present embodiment, the system may display to User 2, a list of friends that possibly know about Tokyo. In this list, User 1 would appear.

It may be appreciated that FIG. 2 provides only an illustration of one implementation and does not imply any limitations with regard to how different embodiments may be implemented. Many modifications to the depicted environments may be made based on design and implementation requirements. For example, as previously described, the Friend Locator program 116A, 116B (FIG. 1) perform text analytics not only on all of a user's friends, but on the user's friends of friends' posts and profile information to determine annotations on the text.

As previously explained, the present embodiment may utilize natural language processing (NLP) to identify the subject of the user's and social media network friend's social media content, profiles, and geography and perform a match based on the information and perform a ranking on the potential match. As such, all the comments, likes, dislikes, about-me, etc. of users who are friends (and friends of friends) of the author may be analyzed to determine if there is any connection. Additionally the present embodiment may find someone within a trusted circle (friend, or friends' friend). Therefore, the present embodiment may not simply match a profile, but match a topic, interest, etc. in order to find someone trustable or familiar based on the social media relationship rather than building a connection with strangers.

More specifically, the present embodiment may allow a user to search for friends based on certain interests. Natural language processing (NLP) is used to analyze all the unstructured posts and comments to determine which social network users are related to the topic the user is interested in and as such, the present embodiment may find people who talked about that topic and who are the user's friends or friends of the user's friends.

Figure 3:
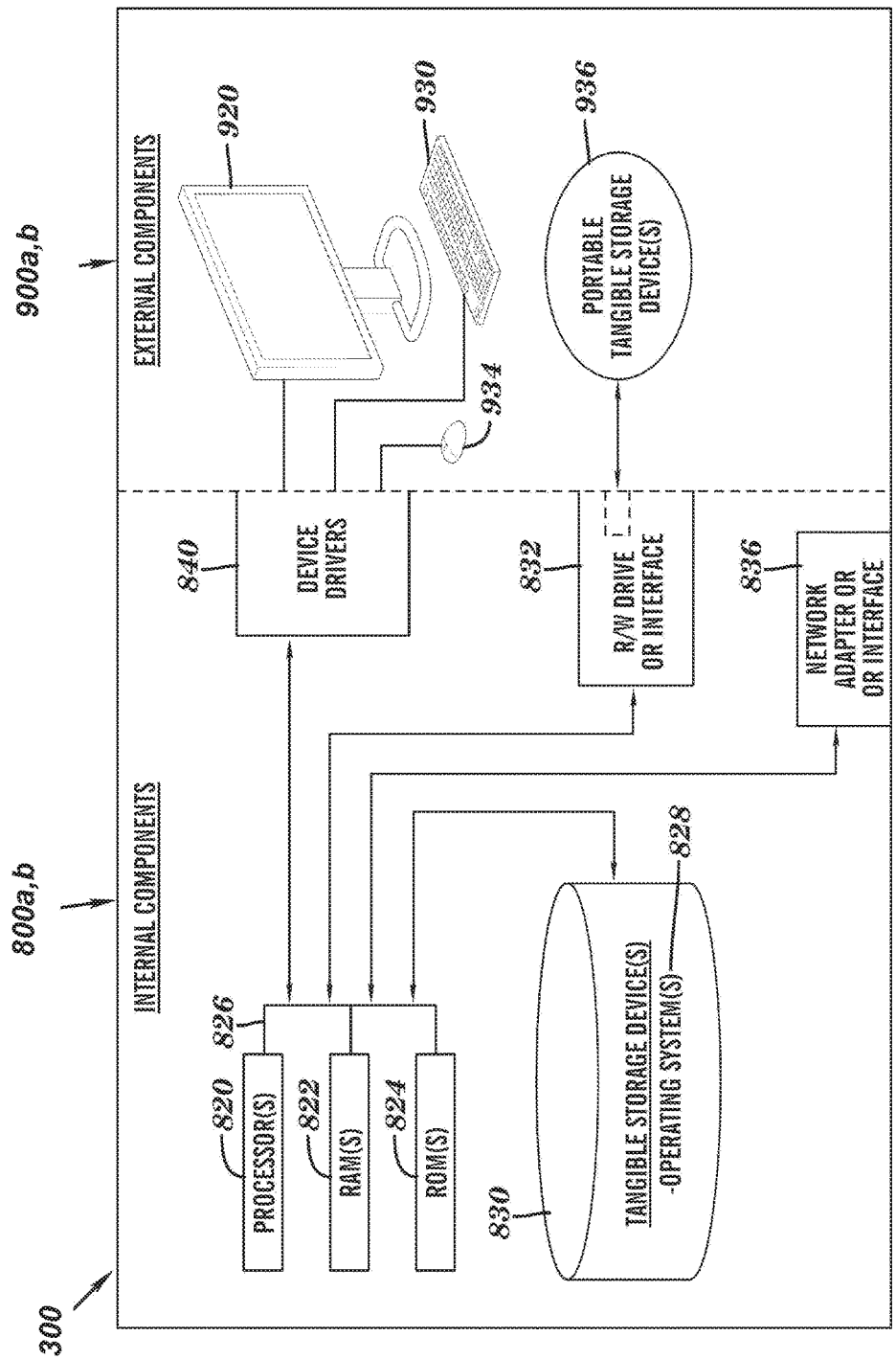
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 3. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Friend Locator program 116A (FIG. 1) in client computer 102 (FIG. 1) and the Friend Locator program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Friend Locator program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Friend Locator program 116A (FIG. 1) in client computer 102 (FIG. 1) and the Friend Locator program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Friend Locator program 116A (FIG. 1) in client computer 102 (FIG. 1) and the Friend Locator program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
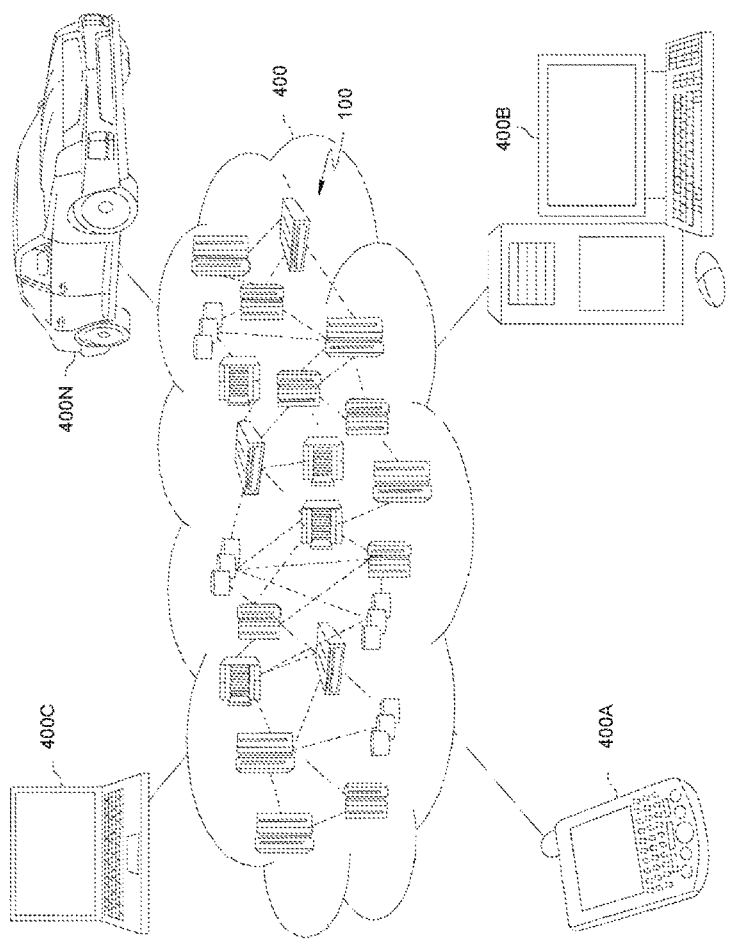
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
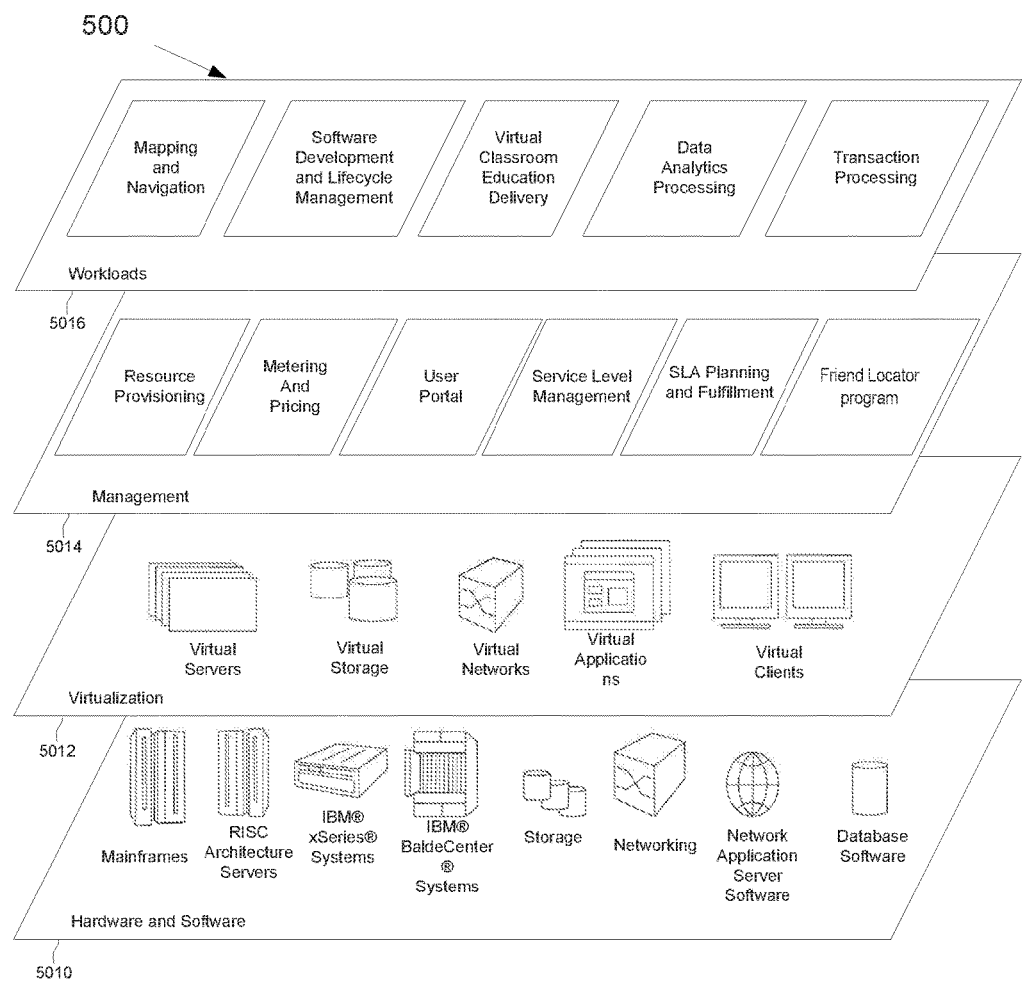
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 5010 includes hardware and software components. Examples of hardware components include: mainframes; RISC (Reduced Instruction Set Computer) architecture based servers; storage devices; networks and networking components. In some embodiments, software components include network application server software.

Virtualization layer 5012 provides an abstraction layer from which the following examples of virtual entities may be provided: virtual servers; virtual storage; virtual networks, including virtual private networks; virtual applications and operating systems; and virtual clients.

In one example, management layer 5014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Friend Locator program may perform text analytics on a user's social media post to propose friends in their social network that might have information regarding the user's post.

Workloads layer 5016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying at least one contact associated with a user and an online communication network, the method comprising:
   receiving, on a first computer, at least one search term or a social media post entered by the user via a graphical user interface associated with a second computer;
   performing text analytics on the received at least one search term or the social media post to determine at least one subject;
   identifying a first plurality of contacts associated with a profile of the user and a first plurality of posts and comments related to the user and a second plurality of contacts associated with a second plurality of posts and comments related to the identified first plurality of contacts, wherein the user and the first plurality of contacts and the second plurality of contacts are associated with the online communication network, and wherein the profile of the user does not include the second plurality of contacts;
   performing text analytics on a plurality of communications and a plurality of profile information associated with the identified first plurality of contacts and the identified second plurality of contacts to determine a plurality of context information, wherein performing text analytics on the plurality of communications further comprises:
      determining a plurality of annotations associated with the plurality of communications; and
      storing the determined plurality of annotations in an online repository;
   comparing the at least one determined subject to the determined plurality of context information, wherein comparing the at least one determined subject to the plurality of communications associated with the identified first plurality of contacts and the identified second plurality of contacts further comprises:
      applying an electronic analytic analysis to the plurality of profile information associated with the identified first plurality of contacts and the identified second plurality of contacts;
      applying the electronic analytic analysis to a plurality of communications retrieved from the user;
      applying the electronic analytic analysis to a plurality of communications retrieved from the identified first plurality of contacts and the identified second plurality of contacts, wherein applying the electronic analysis comprises simultaneously searching multiple online dictionaries and an online parsing rules repository;
   identifying at least one contact within the identified first plurality of contacts or the identified second plurality of contacts based on the comparing, wherein the identified at least one contact meets a greatest strength of relationship criteria to the user and a plurality of communications written by the identified at least one contact along with a plurality of profile information and GPS information associated with the identified at least one contact is determined to have a highest score for matching the at least one determined subject within the plurality of communications, and wherein the identified at least one contact is associated with the profile of the user or at least one profile included the first plurality of contacts; and
   displaying the identified at least one contact along with an identified plurality of information and comments related to the received at least one search term or the social media post and related to the identified at least one contact.

2. The method of claim 1, wherein the online communication network is selected from a group consisting of email, instant message (IM), short message service (SMS), social networking, and WIKI.

3. The method of claim 1, wherein performing text analytics comprises applying at least one of a natural language processing (NLP) technique to the at least one search term, the social media post, and the plurality of communications associated with the identified first plurality of contacts and the identified second plurality of contacts.

4. The method of claim 1, wherein comparing the at least one determined subject to the plurality of context information is based on a similarity ranking.

5. The method of claim 4, wherein the similarity ranking is performed by applying a subject based on a plurality of criteria selected from a group consisting of location, sentiment, age, membership, event, product, and application.

6. The method of claim 1, wherein comparing the at least one determined subject to the plurality of communications associated with the identified plurality of contacts associated with the user further comprises:
   applying an analytic analysis to a plurality of communications retrieved from the user; and
   applying an analytic analysis to a plurality of communications retrieved from the identified first plurality of contacts and the identified second plurality of contacts.

7. The method of claim 1 further comprising:
   displaying a plurality of relevant information associated with the identified at least one contact within the plurality of contacts to the user.

8. A computer system for identifying at least one contact associated with a user and an online communication network, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

receiving, on a first computer, at least one search term or a social media post entered by the user via a graphical user interface associated with a second computer;

performing text analytics on the received at least one search term or the social media post to determine at least one subject;

identifying a first plurality of contacts associated with a profile of the user and a first plurality of posts and comments related to the user and a second plurality of contacts associated with a second plurality of posts and comments related to the identified first plurality of contacts, wherein the user and the first plurality of contacts and the second plurality of contacts are associated with the online communication network, and wherein the profile of the user does not include the second plurality of contacts;

performing text analytics on a plurality of communications and a plurality of profile information associated with the identified first plurality of contacts and the identified second plurality of contacts to determine a plurality of context information, wherein performing text analytics on the plurality of communications further comprises:

determining a plurality of annotations associated with the plurality of communications; and storing the determined plurality of annotations in an online repository;

comparing the at least one determined subject to the determined plurality of context information, wherein comparing the at least one determined subject to the plurality of communications associated with the identified first plurality of contacts and the identified second plurality of contacts further comprises:

applying an electronic analytic analysis to the plurality of profile information associated with the identified first plurality of contacts and the identified second plurality of contacts;

applying the electronic analytic analysis to a plurality of communications retrieved from the user;

applying the electronic analytic analysis to a plurality of communications retrieved from the identified first plurality of contacts and the identified second plurality of contacts, wherein applying the electronic analysis comprises simultaneously searching multiple online dictionaries and an online parsing rules repository;

identifying at least one contact within the identified first plurality of contacts or the identified second plurality of contacts based on the comparing, wherein the identified at least one contact meets a greatest strength of relationship criteria to the user and a plurality of communications written by the identified at least one contact along with a plurality of profile information and GPS information associated with the identified at least one contact is determined to have a highest score for matching the at least one determined subject within the plurality of communications, and wherein the identified at least one contact is associated with the profile of the user or at least one profile included the first plurality of contacts; and displaying the identified at least one contact along with an identified plurality of information and comments related to the received at least one search term or the social media post and related to the identified at least one contact.

9. The computer system of claim 8, wherein the online communication network is selected from a group consisting of email, instant message (IM), short message service (SMS), social networking, and WIKI.

10. The computer system of claim 8, wherein performing text analytics comprises applying at least one of a natural language processing (NLP) technique to the at least one search term, the social media post, and the plurality of communications associated with the identified first plurality of contacts and the identified second plurality of contacts.

11. The computer system of claim 8, wherein comparing the at least one determined subject to the plurality of context information is based on a similarity ranking.

12. The computer system of claim 11, wherein the similarity ranking is performed by applying a subject based on a plurality of criteria selected from a group consisting of location, sentiment, age, membership, event, product, and application.

13. The computer system of claim 8, wherein comparing the at least one determined subject to the plurality of communications associated with the identified plurality of contacts associated with the user further comprises:

applying an analytic analysis to a plurality of communications retrieved from the user; and applying an analytic analysis to a plurality of communications retrieved from the identified first plurality of contacts and the identified second plurality of contacts.

14. The computer system of claim 8, further comprising:

displaying a plurality of relevant information associated with the identified at least one contact within the plurality of contacts to the user.

15. A computer program product for identifying at least one contact associated with a user and an online communication network, the computer program product comprising:

one or more computer-readable storage devices and program instructions stored on at least one of the one or more tangible storage devices, the program instructions executable by a processor, the program instructions comprising:

program instructions to receive, on a first computer, at least one search term or a social media post entered by the user via a graphical user interface associated with a second computer;

program instructions to perform text analytics on the received at least one search term or the social media post to determine at least one subject;

program instructions to identify a first plurality of contacts associated with a profile of the user and a first plurality of posts and comments related to the user and a second plurality of contacts associated with a second plurality of posts and comments related to the identified first plurality of contacts, wherein the user and the first plurality of contacts and the second plurality of contacts are associated with the online communication network, and wherein the profile of the user does not include the second plurality of contacts;

program instructions to perform text analytics on a plurality of communications and a plurality of profile information associated with the identified first plurality of contacts and the identified second plurality of contacts to determine a plurality of context information, wherein performing text analytics on the plurality of communications further comprises:
program instructions to determine a plurality of annotations associated with the plurality of communications; and
program instructions to store the determined plurality of annotations in an online repository;
program instructions to compare the at least one determined subject to the determined plurality of context information, wherein comparing the at least one determined subject to the plurality of communications associated with the identified first plurality of contacts and the identified second plurality of contacts further comprises:
program instructions to apply an electronic analytic analysis to the plurality of profile information associated with the identified first plurality of contacts and the identified second plurality of contacts;
program instructions to apply the electronic analytic analysis to a plurality of communications retrieved from the user;
program instructions to apply the electronic analytic analysis to a plurality of communications retrieved from the identified first plurality of contacts and the identified second plurality of contacts, wherein applying the electronic analysis comprises simultaneously searching multiple online dictionaries and an online parsing rules repository;
program instructions to identify at least one contact within the identified first plurality of contacts or the identified second plurality of contacts based on the comparing, wherein the identified at least one contact meets a greatest strength of relationship criteria to the user and a plurality of communications written by the identified at least one contact along with a plurality of profile information and GPS information associated with the identified at least one contact is determined to have a highest score for matching the at least one determined subject within the plurality of communications, and wherein the identified at least one contact is associated with the profile of the user or at least one profile included the first plurality of contacts; and
program instructions to display the identified at least one contact along with an identified plurality of information and comments related to the received at least one search term or the social media post and related to the identified at least one contact.

16. The computer program product of claim 15, wherein the online communication network is selected from a group consisting of email, instant message (IM), short message service (SMS), social networking, and WIKI.

17. The computer program product of claim 15, wherein performing text analytics comprises applying at least one of a natural language processing (NLP) technique to the at least one search term, the social media post, and the plurality of communications associated with the identified first plurality of contacts and the identified second plurality of contacts.

* * * * *